United States Patent [19]

Iwashita et al.

[11] Patent Number: 5,160,952
[45] Date of Patent: Nov. 3, 1992

[54] PRINT CONTROL APPARATUS

[75] Inventors: Tomonori Iwashita, Yokohama; Akira Egawa, Machida; Yoshiaki Sugiyama, Tokyo, all of Japan

[73] Assignee: Canon Kabushiki Kaisha, Tokyo, Japan

[21] Appl. No.: 686,836

[22] Filed: Apr. 17, 1991

Related U.S. Application Data

[63] Continuation of Ser. No. 346,914, May 4, 1989, abandoned.

[30] Foreign Application Priority Data

May 9, 1988 [JP] Japan .................... 63-113277

[51] Int. Cl.⁵ .................... G03B 29/00; G03B 17/24
[52] U.S. Cl. .................... 354/76; 354/105; 354/104; 355/40
[58] Field of Search .............. 354/21, 76, 105, 106, 354/109; 355/38, 40, 41

[56] References Cited

U.S. PATENT DOCUMENTS

| | | | |
|---|---|---|---|
| 4,290,688 | 9/1981 | Call | 354/106 X |
| 4,500,183 | 2/1985 | Tanikawa | 354/21 |
| 4,780,735 | 10/1988 | Taniguchi et al. | 354/106 X |
| 4,823,163 | 4/1989 | Rollet et al. | 355/41 |

Primary Examiner—Richard A. Wintercorn
Assistant Examiner—D. Rutledge
Attorney, Agent, or Firm—Fitzpatrick, Cella, Harper & Scinto

[57] ABSTRACT

A camera which includes a setting means for setting an indication information to indicate that a data should be printed on the back surface of the printed photograph and a recording means for recording the indication signal set by setting means, and a printing apparatus which includes a reading means for reading the indication information recorded by said recording means and a control means for printing the data onto the reverse surface of the printed photograph in response to the indication information read by said reading means.

78 Claims, 11 Drawing Sheets

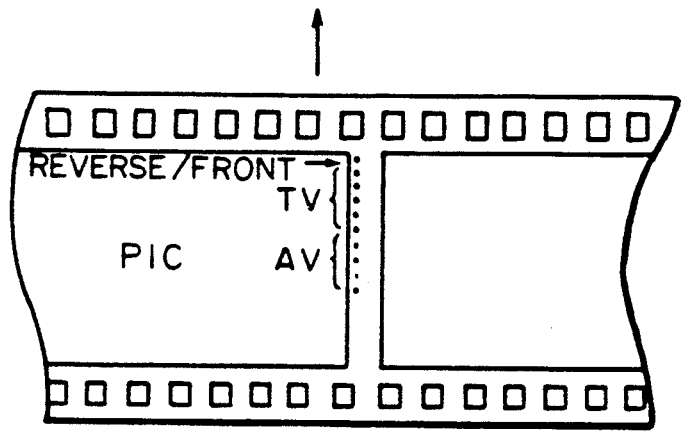
FIG. 7
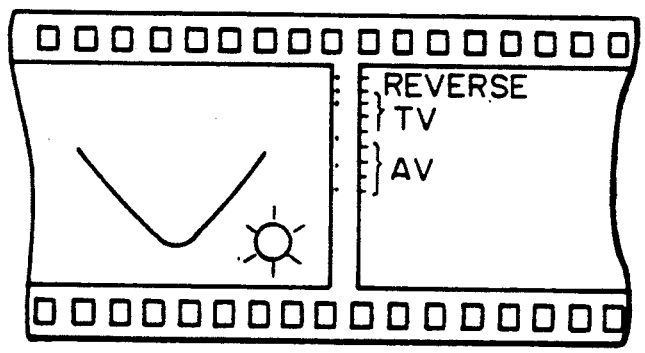
FIG. 8
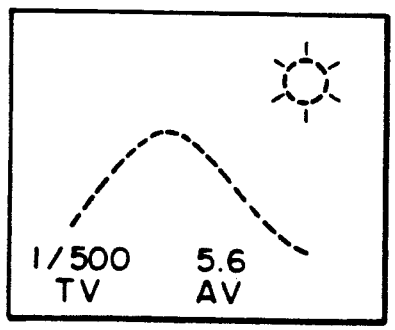 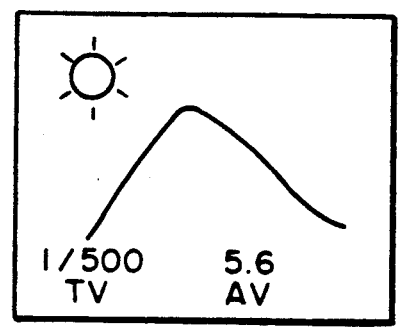
FIG. 9A                FIG. 9B

PRINT CONTROL APPARATUS

This application is a continuation of application Ser. No. 07/346,914 filed May 4, 1989, now abandoned.

BACKGROUND OF THE INVENTION

1. Field of the Invention

The present invention relates to a camera capable of imprinting coded data, photographing data or a photographing date or the like, and a printing apparatus capable of decoding and printing said data onto the front or reverse surface of the printing paper.

2. Related Background Art

Many kinds of cameras capable of imprinting data onto printing paper have been proposed and sold in the market. Besides, Japanese Laid-Open Patent 62-50743 discloses a camera capable of trimming photography in which the trimming is effected during the printing process. The above-mentioned camera has a code signal generation means which generates coded signal corresponding to the data to be imprinted onto the film and an imprinting means which imprints the code image corresponding to the code signal into a region out of the scene area on the film surface. In the printing process, the data decoded from said code image is imprinted onto a corner portion or the white frame portion of the printing paper.

However, in those types of cameras, it is difficult to discriminate the letters imprinted onto the printing paper when the luminance of the object photographed at a place where the letters should be printed is high or when the color of the object is similar to the color of the printed letters. In connection with the above mentioned drawback, it would be possible to select an appropriate letter's color distinguishable in the scene during the printing process. However, selecting the color of letters suitable for the background condition requires special skill. Further, in the case of some kind of pictures, for example artistic photographs, the letters imprinted in the photograph are undesirable. To provide a white data area at a corner of the photograph is also undesirable because the effective photographing area is limited. In spite of the above-mentioned drawbacks, it is still useful to imprint the data onto the film surface because the correlation between the picture and the data can be immediately checked.

SUMMARY OF THE INVENTION

It is an object of the present invention to provide a camera having a setting means for setting an indication information which indicates the data should be imprinted onto the reverse surface of the printing paper and a recording means for recording the indication signal set by said setting means thereby dealing with both requirement of artistry and recording ability.

A second object of the present invention is to provide a printing apparatus having a reading means for reading the indication information recorded by said recording means and a control means for imprinting the data onto the reverse surface of the printing paper in response to the indication information read by said reading means thereby dealing with both requirement of artistry and recording ability.

Other objects of the present invention will be apparent from the following description concerning the preferred embodiments.

BRIEF DESCRIPTION OF THE DRAWINGS

FIG. 7 shows the status of the imprinted code imprinted by nine LED's used in the first embodiment.

FIG. 8 shows the imprinted code illustrated in FIG. 2.

FIG. 9A shows an example in which the data is imprinted on the reverse surface of the printing paper.

FIG. 9B shows an example in which the data is imprinted on the front surface of the printing paper.

DETAILED DESCRIPTION OF THE PREFERRED EMBODIMENTS

The preferred embodiment of the present invention will now be described in reference to the drawings.

Figure 1:
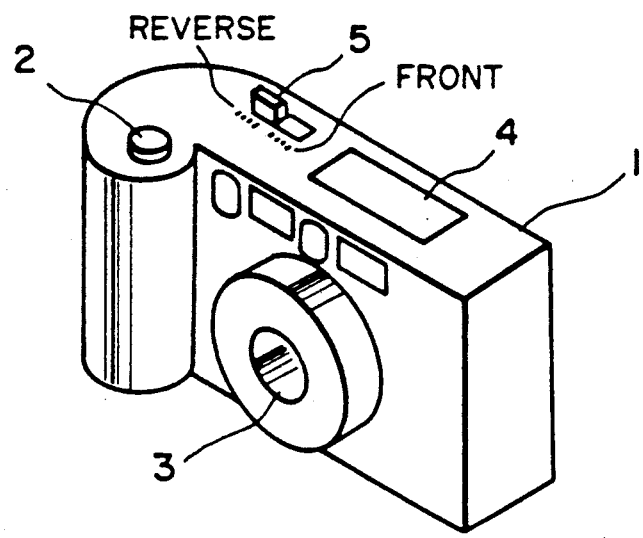
FIG. 1 shows a perspective view of the first embodiment of a camera according to the present invention.

FIG. 1 shows a perspective view of the first embodiment of a camera according to the present invention.

In FIG. 1, numeral 1 denotes a camera body, 2 denotes a shutter release button, 3 denotes a photographing lens, and 4 denotes a liquid crystal display panel. Numeral 5 denotes a selection member which selects whether the data should be recorded on the front or reverse surface of the printing paper. On the upper surface of the camera body, there is provided a "reverse" and a "front" indication, and when the selecting member 5 is switched to the "reverse" position, as shown in FIG. 1, the recording information is recorded onto the reverse surface of the printing paper as will be described later.

Figure 2:
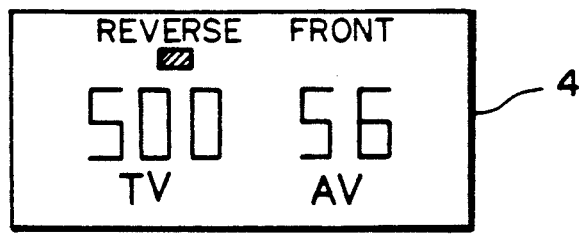
FIG. 2 shows one example of an indication displayed by the liquid crystal display panel depicted in FIG. 1.

FIG. 2 is an example of indication of the liquid crystal display panel 4, as printing characters, "reverse", "front", "TV", and "AV" are displayed. In FIG. 2, mark is indicated, which shows that a mode for printing the data onto the reverse surface of the printing paper is set. The characters "TV" correspond with shutter speed and the numeral 500 shows the shutter speed of 1/500 sec. "AV" denotes an aperture value and the numeral 5.6 shows the aperture value of F5.6.

Figure 3:
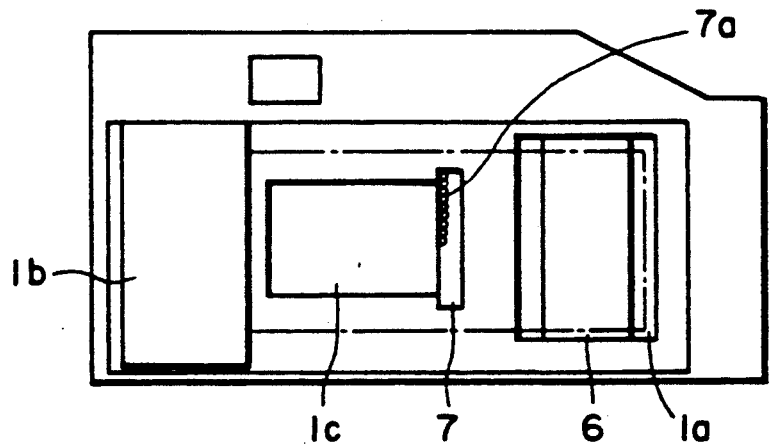
FIG. 3 shows a state of camera the back plate of which is opened.

FIG. 3 shows a real elevation view of the camera in which the back plate (not shown) is opened. In the figure, numeral 1a denotes a spool chamber, 1b denotes a film cartridge chamber in which the film cartridge will be set when the photographing is performed, and 1c denotes a view field frame. Numeral 6 denotes a spool to which the film in the film cartridge is to be wound. Numeral 7 denotes a code imprinting unit by which the photographing information is imprinted on the film at a place out of the picture frame. The code imprinting unit having nine LED's 7a connected with optical fiber is located so as to oppose to the emulsion surface of the film as shown in this embodiment.

Figure 4:
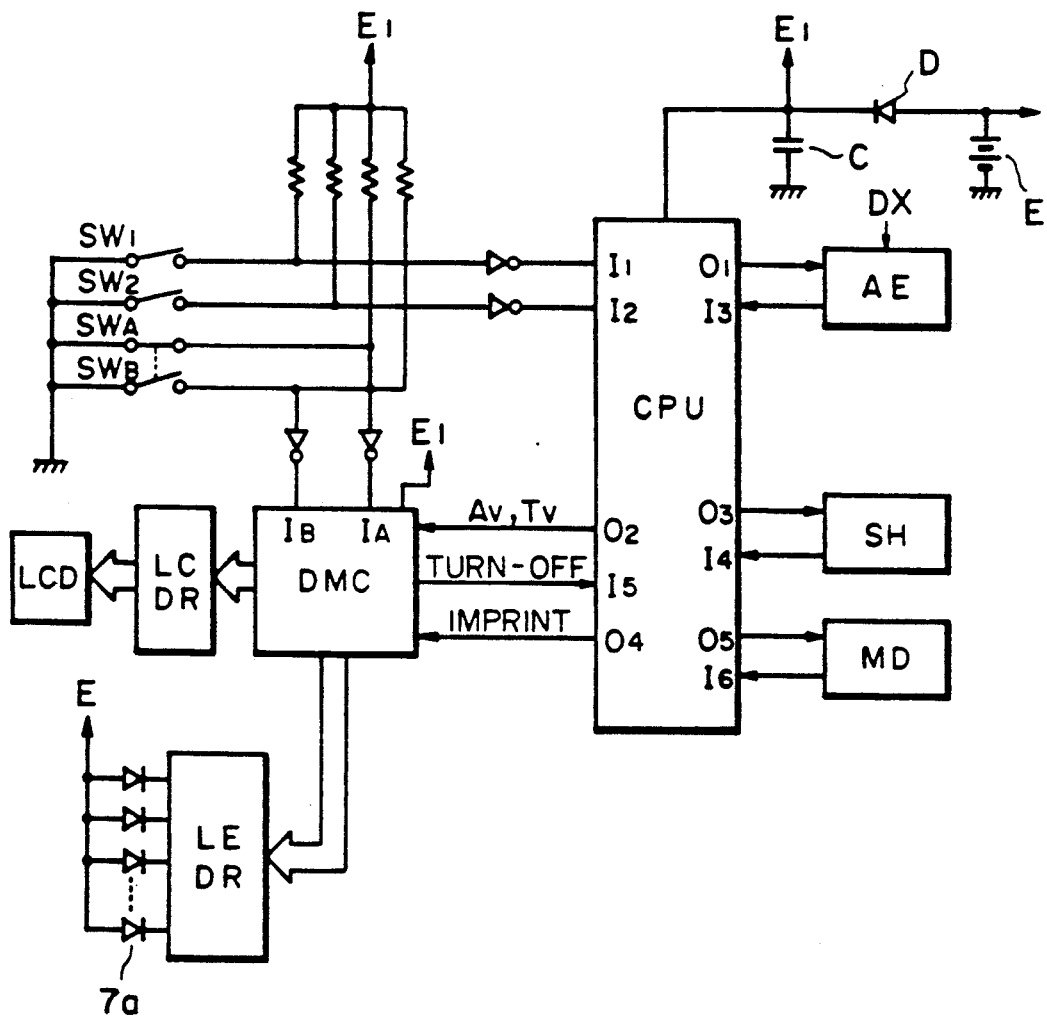
FIG. 4 shows a circuit diagram performing the first embodiment of the present invention.

FIG. 4 is a circuit diagram which embodies the first embodiment of the present invention. In the figure, CPU denotes a controlling microprocessor for controlling the camera, DMC denotes a microprocessor for controlling the data indication, LCDR denotes a liquid crystal driving circuit for controlling the liquid crystal display panel 4, and LEDR denotes an LED driving circuit for driving the LED's in the code imprinting unit 7.

The power source battery E supplies the control microprocessor CPU and the display microprocessor DMC with voltage E1 which is stabilized by a stabilization circuit constituted by diode D and condenser C. Switches $SW_A$ and $SW_B$ are switched between ON and OFF states corresponding to the movement of the selection member 5. When the selection member is switched to the indication "reverse", $SW_A$ is in ON state and $SW_B$ is in OFF state.

AE, SH, MD, respectively, denote known photometry processing circuit, shutter control circuit, and film winding circuit.

The operation of the circuit shown in FIG. 4 will be described on the basis of the flowchart shown in FIG. 5.

Figure 5:
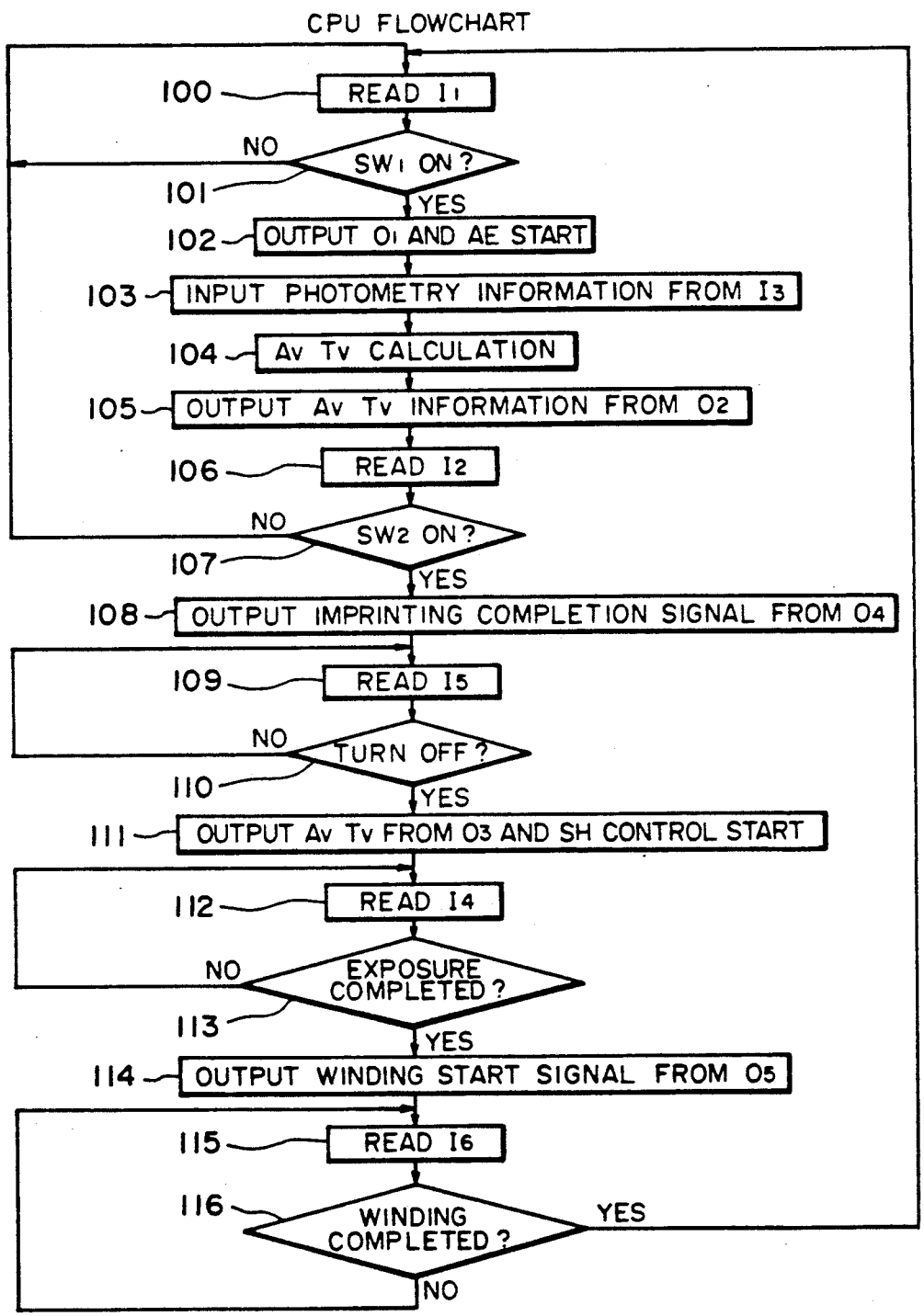
FIG. 5 shows a flowchart of the controlling microprocessor depicted in FIG. 4.

In FIGS. 4 and 5, the condition of $SW_1$ is read from the input terminal $I_1$ in step #101. In step #101, if the switch $SW_1$ is on, the process proceeds to step #102, and if the switch $SW_1$ is off, the process returns to step #100. In step #102, a start signal is output from an output terminal $O_1$ to the photometry operation circuit AE to start the photometry operation. In step #103 an input terminal $I_3$ receives an illumination information of the object from the circuit AE. In step #104, $A_V$ and $T_V$ values are calculated from the illumination information. The $A_V$ and $T_V$ values are output to the display microcomputer DMC from a terminal $O_2$ in step #105 and they are received by DMC in step #209 of FIG. 6 to indicate the $A_V$ and $T_V$ value on the LCD. In step #106, the condition of the switch $SW_2$ is read from a terminal $I_2$. In step #107, if the $SW_2$ is off, the process returns to #100 and above-described sequence will be repeated, and if the $SW_2$ is on, the process proceeds to step #108 to output the imprinting signal to DMC from an output terminal $O_4$. The imprinting signal is received in step #211 of the flowchart in FIG. 16. In next step #109, the condition to a turn-off signal showing the completion of imprinting operation by the DMC is read from an input terminal $I_5$. Step #110 checks the state of the turn-off signal input. If the state is not off, the turn-off signal is again read in step #109 and if the state is off, the process proceeds to step #111 in which the $A_V$ and $T_V$ information is sent to the shutter control circuit SH from an output terminal $O_3$ and the shutter control circuit SH starts the controlling of the exposure. The exposure termination signal from the shutter control circuit SH is input from input terminal $I_4$ in step #112 and step #113 judges whether the exposure operation has been completed or not. If the exposure operation has been completed, the process proceeds to step #114 and if the exposure operation has not been completed, the process returns to step #II2 and reads the signal from the input terminal $I_4$ again. In step #114, a film winding start signal is output from output terminal $O_5$. In steps #115 and #116, the process waits for a winding completion signal from the film winding circuit MD and when the signal is input, the process returns to the step #100 and the photographing sequence is repeated.

Figure 6:
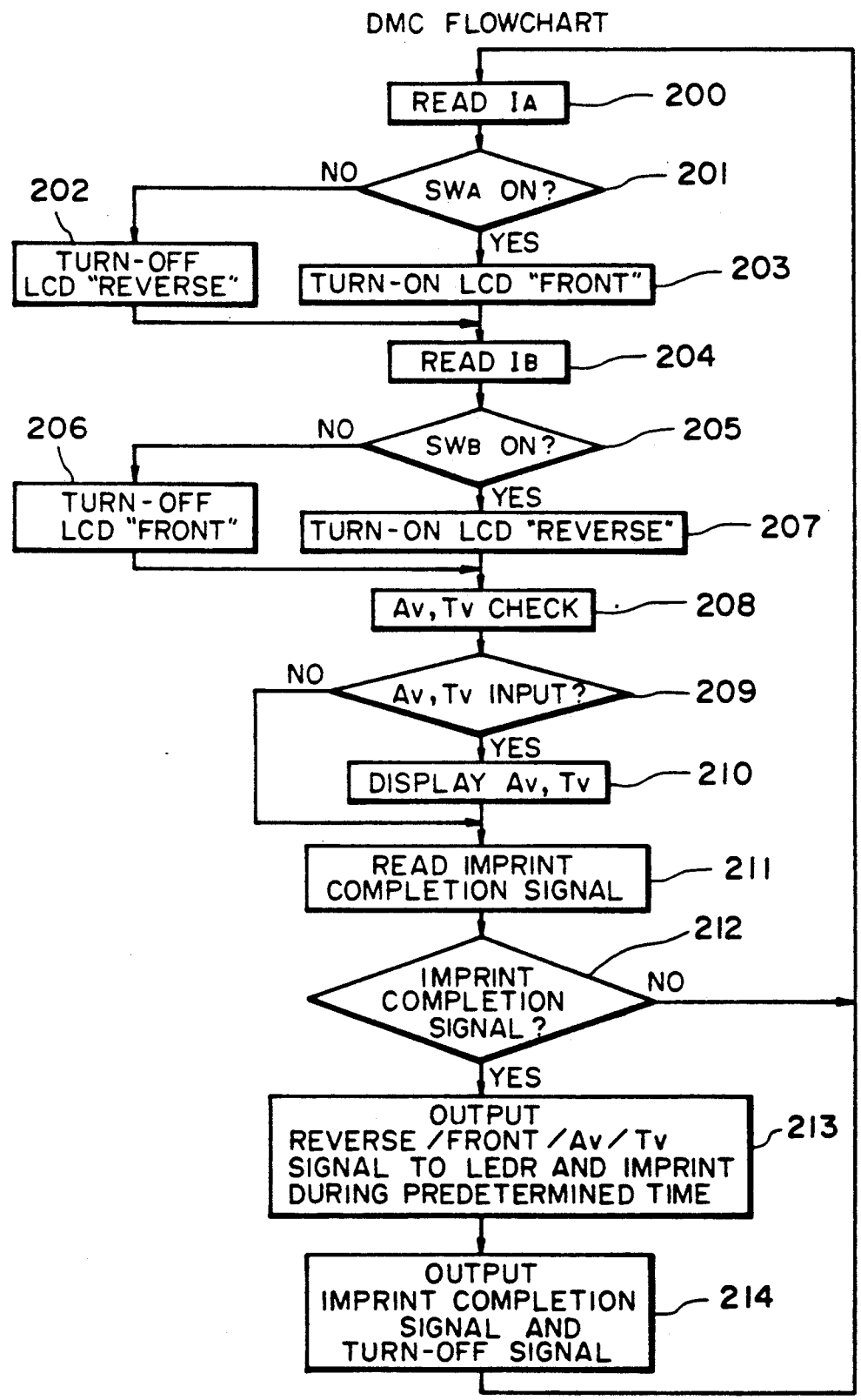
FIG. 6 shows a flowchart of the indication microprocessor depicted in FIG. 4.

FIG. 6 shows a flowchart of the DMC in FIG. 4. In step #200, the switching state of $SW_A$ is input from input terminal $I_A$ the condition of which is judged in step #201. If $SW_A$ is on, the process proceeds to step #203 and outputs data to LCDR for displaying "reverse" indication to the LCD. If $SW_A$ is off, the process proceeds to step #202 and outputs a data to LCDR so as to turn off the indication of "reverse". The switching state of $SW_B$ is input in step #204 from input terminal $I_B$ and the condition of $SW_B$ is judged in step #205. In step #205, if $SW_B$ is on, the process proceeds to step #207 and outputs a data to LCDR to display the indication of "front", and if $SW_B$ is off, the process proceeds to step #206 and outputs a data to LCDR to turn off the indication of "front". Step #208 checks the terminal which receives the information of $A_V$ and $T_V$ from CPU. If the $T_V$, $A_V$ information are received in step #209, the data is sent to LCDR for displaying the $A_V$ and $T_V$ information on LCD. If no data is received, the process proceeds to step #211. The step #211 checks the input of the imprint signal. In the next step #212, if the imprint signal 21 is input, the process proceeds to step #213 and if the imprint signal is not input, the process returns to step #200 and above-described sequence is repeatedly performed. In step #213, the front-/reverse information and the $A_V$, $T_V$ information are coded and appropriately selected LED 7a in the code imprinting unit 7 are informed to LEDR for imprinting the data to the film by turning on the LEDs. In the next step #214, the completion signal of imprinting is output to the CPU and the process returns to step #200.

FIG. 7 is to explain the content of code signal imprinted to the film by turning on and off of the nine LCD's of the first embodiment. The direction of the arrow corresponds with the upper direction of the camera body 1. The code shows the data of the picture denoted by $P_{ic}$.

The uppermost first bit designates that the data should be recorded on the reverse surface of the front surface of the printing paper. Where the data should be recorded onto the reverse surface, the LED is turned on and a point-like image is imprinted to the film and, on the other hand, where the data should be recorded onto the front surface, the point-like first bit image is not imprinted.

The following four bits correspond with the code of the photographing shutter speed and further four bits correspond with the code of the aperture value.

The table 1 shows a code diagram of the shutter speed and the aperture value. The letter "1" denotes that a point-like image is imprinted by turning-on of the LED and "0" denotes that the point-like image is not imprinted.

TABLE 1

| Code | Shutter speed sec. | Apertue value |
|------|--------------------|--------------| 
| 0000 | 16 | 1 |
| 0001 | 8 | 1.4 |
| 0010 | 4 | 2 |
| 0011 | 2 | 2.8 |
| 0100 | 1 | 4 |
| 0101 | ½ | 5.6 |
| 0110 | ¼ | 8 |
| 0111 | ⅛ | 11 |
| 1000 | 1/15 | 16 |
| 1001 | 1/30 | 22 |
| 1010 | 1/60 | 32 |
| 1011 | 1/125 | |
| 1100 | 1/250 | |
| 1101 | 1/500 | |
| 1110 | 1/1000 | |
| 1111 | 1/2000 | |

For instance, when the display panel is in a state shown in FIG. 2, i.e. reverse surface data recording, $T_V$: 1/500, $A_V$: 5.6, the first bit is "1", the $T_V$ bits are "1101", and the $A_V$ bits are "0101". Accordingly, the code imprinted into the film is as follows:

"1 1 1 0 1 0 1 0 1"

The code shown above will be imprinted as the point like images of LED 7a as depicted in FIG. 8.

The film to which the above mentioned code is imprinted is printed as shown in FIG. 9A by a printing device which will be described later. FIG. 9A shows that the data is recorded on the reverse surface of the printing paper. In FIG. 9B, different from FIG. 9A, the data is recorded onto the front surface of the recording paper. In this case, the code imprinted into the film is "011010101" in which the first bit point-like image is not imprinted.

With respect to the first embodiment, it has been described that the data is selectively recorded onto the front surface or the reverse surface of the printing paper. However if there is a case where more data other than in the first embodiment are required, for instance, a photographing date data, a photographing time data, a film count data, or the like.

The second embodiment shows that the data divided into two groups and recorded onto the front surface and reverse surface of the printing paper, respectively. For example, the data closely related to the picture is recorded onto the front surface and the data remotely related to the picture is recorded onto the reverse surface.

Figure 10:
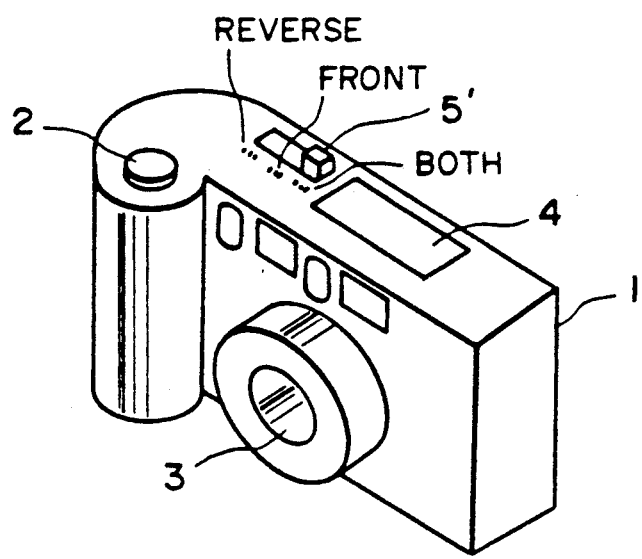
FIG. 10 shows a perspective view of the second embodiment of the camera according to the present invention.
Figure 11:
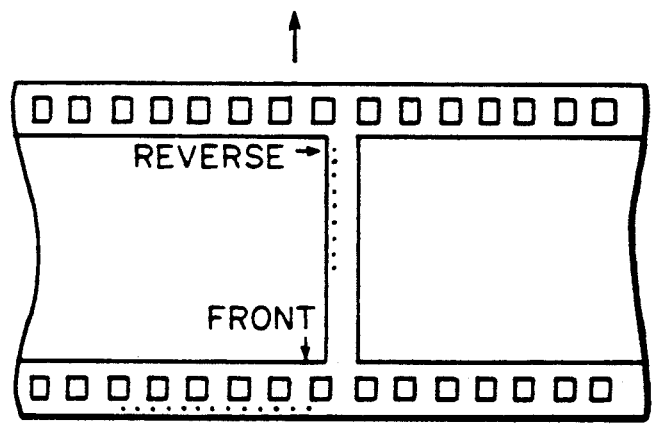
FIG. 11 shows a location of the imprinted codes photographed by the camera of the second embodiment.

FIG. 10 shows a perspective view of the camera of the second embodiment. The selecting member 5' is switchable to three positions "reverse", "front", and "both". Note that the same member as in FIG. 1 is referred by the same numeral and detailed explanation of which will be omitted. The code arrangement of the second embodiment is shown in FIG. 11. The code that should be recorded onto the front surface of the printing paper is imprinted within the picture frame range, and the code that should be recorded onto the reverse surface of the printing paper is imprinted on the perforation side.

Figure 12:
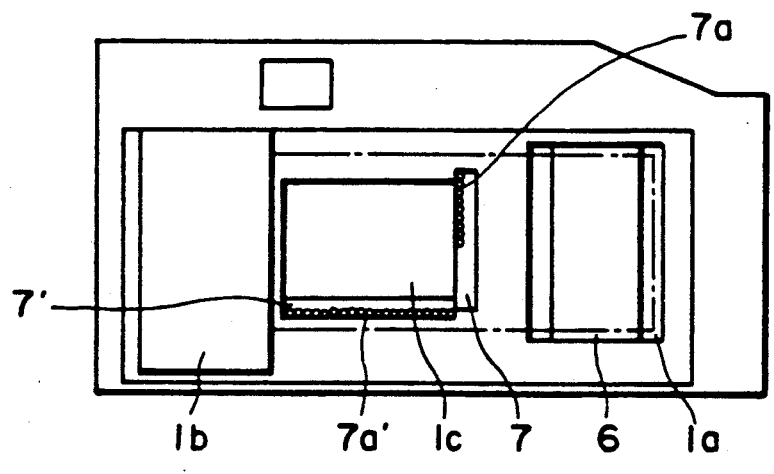
FIG. 12 shows the state of the camera in FIG. 9 with the back plate thereof being opened.

When selection member 5' depicted in FIG. 10 is positioned at the indication "reverse", the code at the perforation side is imprinted, when it is positioned at the indication "front", the code within the picture frame is imprinted, and when it is positioned at the indication "both", the both data are imprinted. FIG. 12 shows the camera of FIG. 11 in which the back panel (not shown) is opened. The difference over FIG. 3 is that LED denoted by 7a' are laterally located to constitute the code imprinting unit which is oppositely mounted to the emulsion surface of the film.

Figure 13:
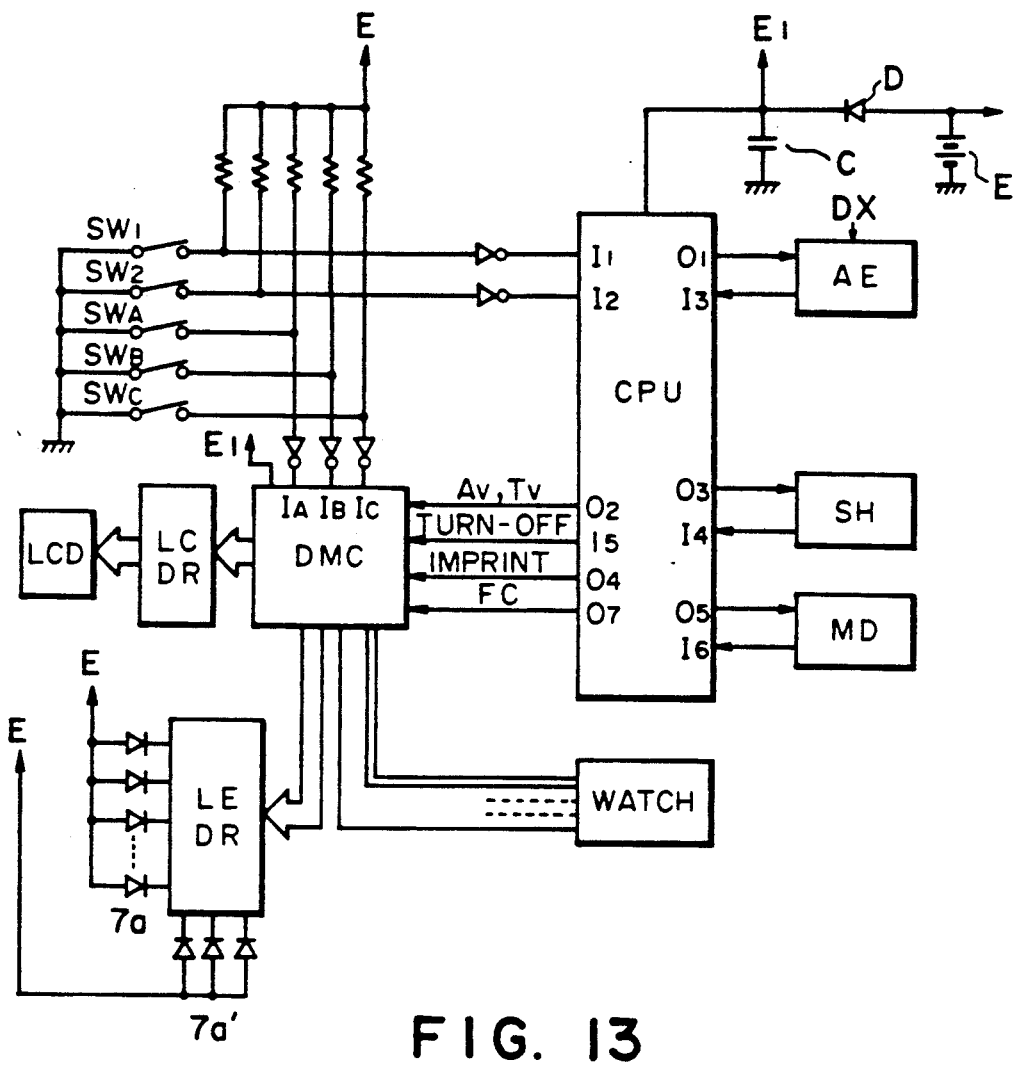
FIG. 13 shows a circuit diagram performing the second embodiment.

FIG. 13 shows a circuit diagram which essentially performs the second embodiment of the present invention. Note that the same member as in FIG. 4 is referred by the same numeral and detailed explanation of which will be omitted. There is provided switches $SW_A$, $SW_B$, and $SW_C$ which change their ON/OFF state in correspondence with the movement of the selection member 5'. These switches are constituted so that only one switch is in the on state at a time.

Figure 14:
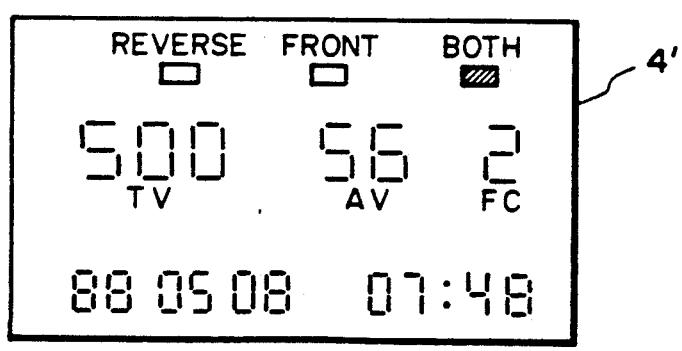
FIG. 14 shows an example of indication of the liquid crystal display panel of the camera in FIG. 10.

When the selection member 5' is switched to the indication "both" as shown in FIG. 10, the switch $SW_C$ becomes on and other switches $SW_A$ and $SW_B$ become off so that the $I_C$ terminal of the display microcomputer DMC goes to a high level. In this case, as shown in FIG. 14, a mark is displayed below the indication "both" of the liquid crystal display panel 4'.

Since FIG. 13 is almost the same as the circuit of FIG. 4, the function of which will not be described in detail. An output terminal $O_7$ of the control microcomputer outputs a film counter value. In response to the completion of code imprinting, that is, the turning-off signal of LED 7a, 7a', the input terminal $I_5$ goes to a high-level and a signal for energizing the film winding circuit MD is output from the output terminal $O_5$. The film counter value is latched until a high-level signal is input from the input terminal $I_6$ in response to the completion of film winding operation. When the terminal $I_6$ receives the high-level signal, the control microcomputer incrementally adds +1 to the film counter value. WATCH denotes a timer circuit which outputs the information of date and time to the display microcomputer to be indicated by the liquid crystal display panel LCD through the liquid crystal driving circuit LCDR.

A detailed explanation of the code imprinting operation will be omitted since LED 7a' is merely added to LED 7a of the first embodiment.

Figure 15:
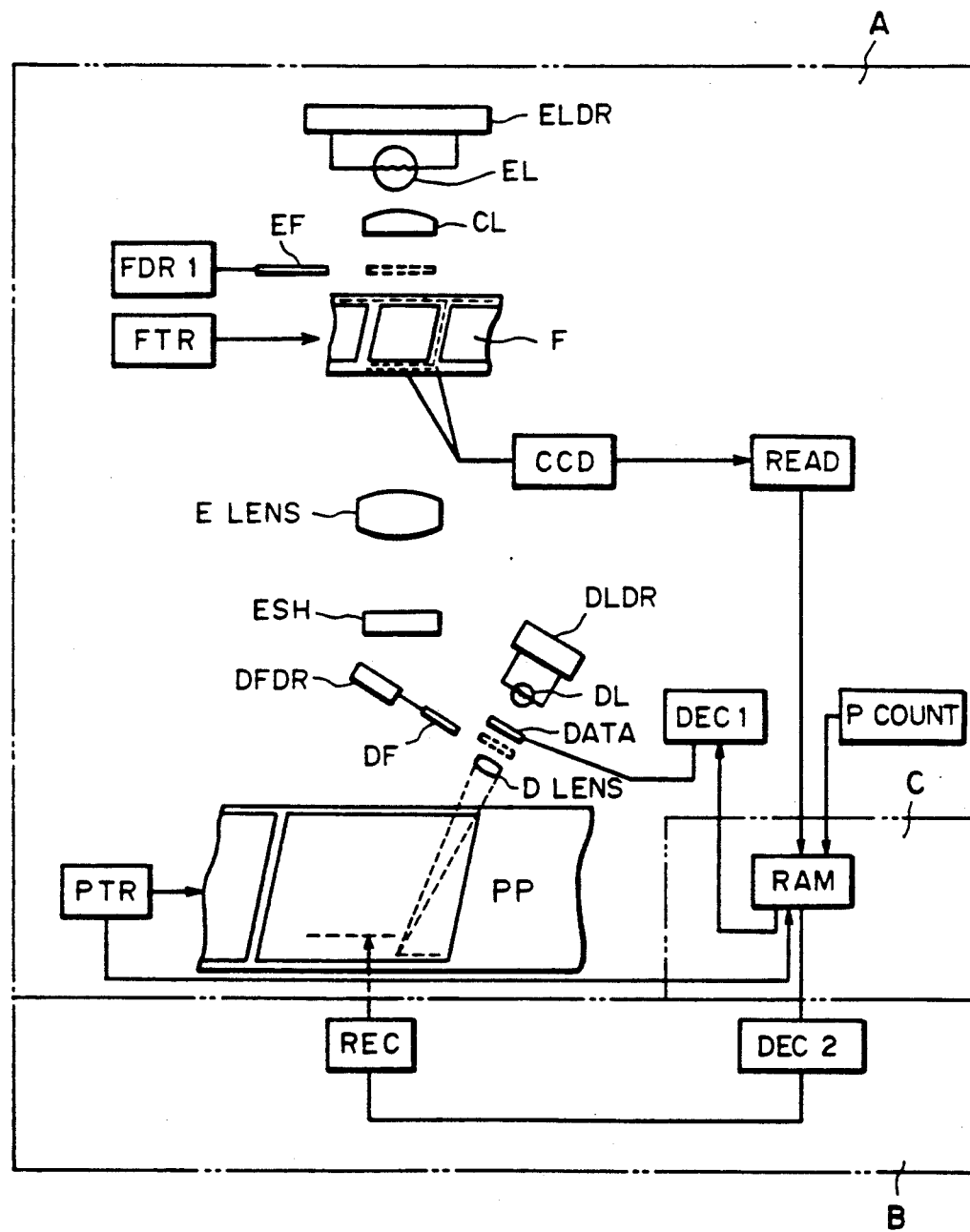
FIGS. 15 and 16 show constructional views of the printing apparatus having a recording device for recording the data.

FIG. 15 shows a printing apparatus by which the film in which the data corresponding to each data is imprinted by above-described camera is printed, and after that, the data is recorded onto the front or the reverse surface of the printing paper. In the figure, character A denotes a printing device, B denotes a data recording device, and C denotes a RAM card which stores a code corresponding to the data.

Figure 16:
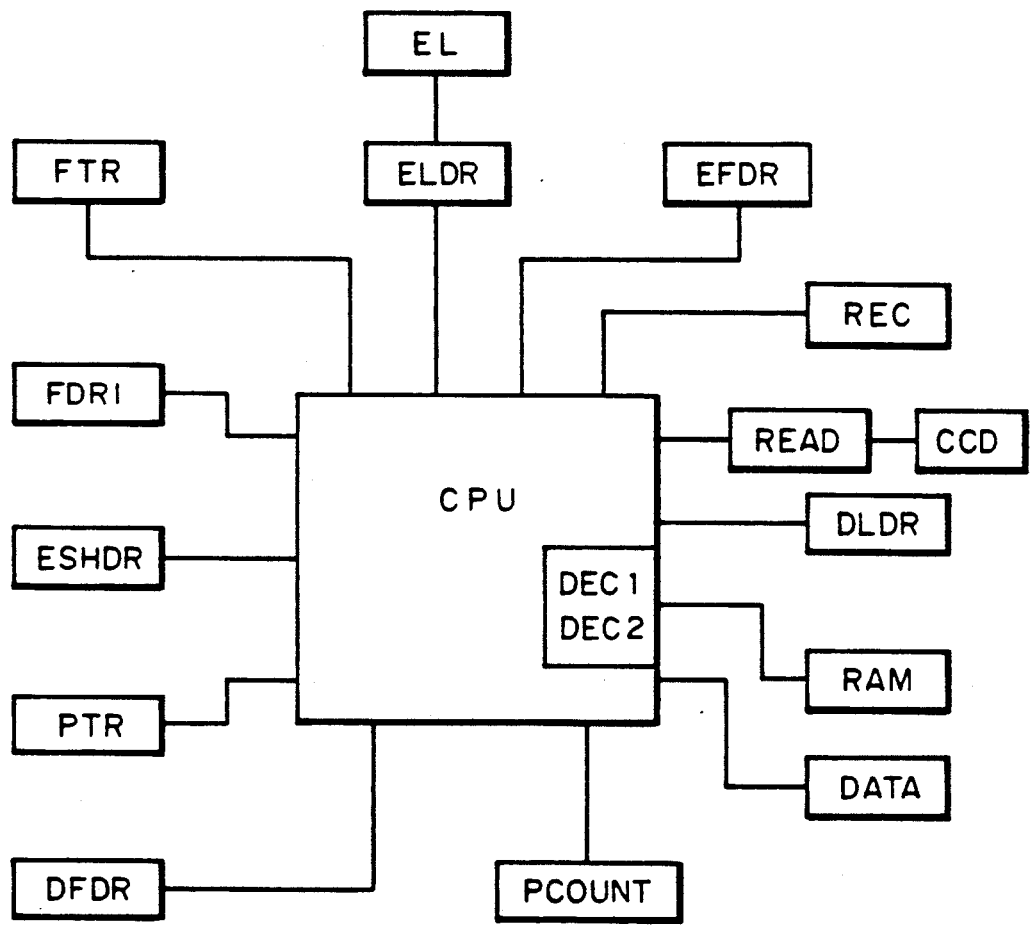
Figure 17:
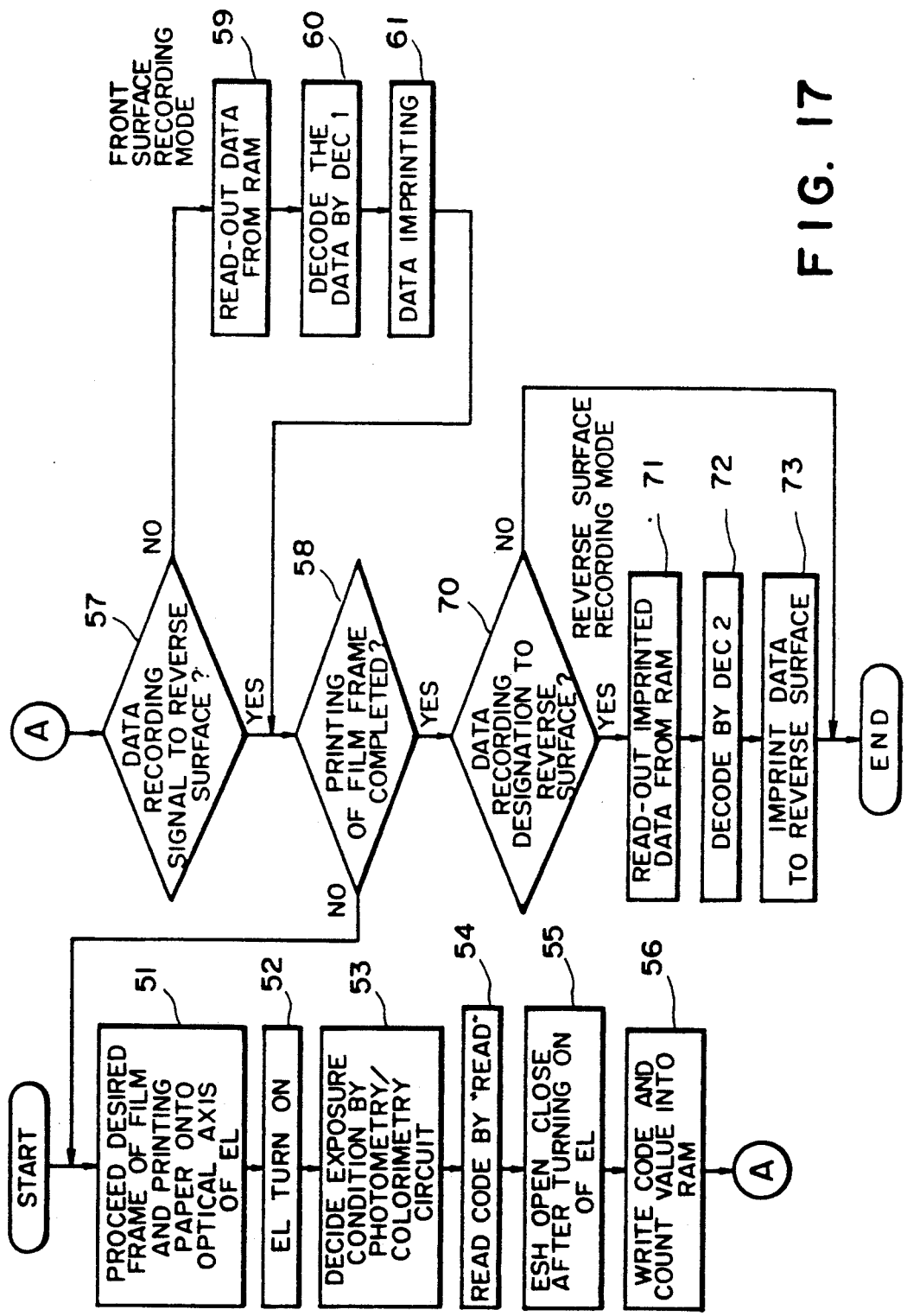
FIG. 17 shows a flowchart illustrating the operation sequence of the apparatus of FIGS. 15 and 16.

In the printing device A, EL denotes an enlargement lamp, CL condenser lens, and ELDR an enlargement lamp driving circuit for controlling the ON/OFF of the enlargement lamp. The apparatus shown in FIG. 15 is controlled by CPU as shown in FIG. 16. The operation of the apparatus will be described in accordance with the flowchart of FIG. 17.

In step #51, the film driving device FTR proceeds the film F so that a desired frame of the film is fed onto the optical axis of the enlargement lens ELENS to be printed. On the other hand, the printing paper PP (a roll state) is also proceeded to a proper position by the printing paper driving device PTR.

At first, the shutter ESH is closed and the enlargement lamp EL is turned on for a predetermined time by the enlargement lamp driving circuit ELDR at step #52. In step #53, the exposure condition is determined by the photometry and colorimetry circuit which is not shown. The code imprinted into a region out of the photographing scene of the film is read by the data code reading device READ through the line sensor CCD which receives the light projected by the enlargement lamp EL in step #54.

The filter driving device DFDR selects an appropriate filter DF which will be located in the optical path of the enlargement lens DLENS. A photometry circuit, not shown, decides a shutter speed and aperture value. The enlargement lamp driving circuit DLDR turns-on the enlargement lamp DL, and the enlargement shutter ESH is thereby opened and printing is started. By closing the enlargement shutter ESH, the exposure is finished and the enlargement lamp EL is turned off. The RAM card C mounted to the printing apparatus has a printing number counter (corresponding to the film counter of the camera) which is rewritten in response to the enlargement shutter ESH closing operation and memorizes a code corresponding to the data read by the data code reading device READ in its memory. The printing number counter PCOUNT which is incrementally increased by +1 at each opening operation of the shutter ESH is important when the data and the picture are verified after completion of the printing operation of all frames.

[I] Where the code read by the data code reading device READ shows that the data should be recorded onto the front surface of the photograph, as shows in steps #57 to #61, the data read out from the RAM card is decoded by the decoder DEC1, the data generation means DATA having indication elements, such as liquid crystal, generates the data, the filter DF is inserted into the optical path of the data imprinting lens DLENS by the filter driving circuit DFDR under consideration of the color arrangement of the data imprinting area the data imprinting lamp driving circuit DLDR is performed during a predetermined time, and the data is imprinted by the data imprinting lamp DL.

[II] Where the code read by the data code reading device READ shows that the data should by recorded onto the reverse surface of the photograph, the printing paper proceeding device PTR serves a frame of the film appropriately on the optical axis of the enlargement lens ELENS (#51 to #55) until expiration of the film (#58), the enlargement lamp EL is turned on (at this time the enlargement shutter ESH is still closed), the exposure condition is determined, the data code reading device READ reads the imprinted code (#54), the enlargement shutter ESH is opened and closed after a turning on of the enlargement lamp (#55), and the printing paper PP is suitably exposed. If no remaining frames of the film are detected in step #58, a designation of data recording is discriminated in step #70. If no data recording signal is detected, the sequence terminates. When the data recording signal to the reverse surface is detected, the data recording is performed. With regard to this operation, if the characters recorded by the data recording device REC are to be smudged by the chemicals used in development or printing, the data recording operation may be executed after completion of development or the like. As shown in steps #71 to #73, the data for printed picture is read out from the RAM card C and is decoded by the decoder DEC2, and the frames designated to record onto the reverse surface are read out from the RAM card, and the data is successively recorded. In this sequence, since the RAM card C also counts in the printing number counter PCOUNT the frames to be recorded onto the front surface, the datas having the reverse surface recording designation are selectively recorded by inversely counting from the latest printing counter value. The data without the reverse printing designation is skipped. Since incrementation of the printing number counter PCOUNT is performed in the next printing operation, no recording errors occur.

Where a recording designation for both sides is imprinted on the recording paper, in the above-described embodiment, the data is printed as same as the photographic image in the film. However, it also can be adopted to record onto the front surface, and the reverse surface respectively, by the data recording device REC after completion of printing of all frames. Where the frames have some different printing sizes, the data may be recorded with proceeding the printing paper by a certain amount which is previously memorized in the RAM of the printing paper proceeding device PTR.

It should be noted that the newly proposed features according to the present invention are the data code reading device READ, and RAM of the RAM card with data therein. The other part of the device is the same as known in an automatic printing apparatus. In the present embodiment, it has been described that all of the frames in a film are scanned previous to the printing operation to memorize the frame number, the multiplex code, and the cancellation code, and, after that, the printing operation is executed in accordance with the code from the first frame. On the other hand, it would be possible to save the rewinding time by memorizing the data taken out before the printing operation into the RAM. For recording the data onto the reverse surface of the printed photograph, conventional printer capable of printing the exposure correction value and the printing number is available. Since the exposure correction data corresponds with each photograph, it may be simultaneously recorded with the information previously memorized in RAM in synchronism with the exposure correction data.

Concerning imprinting of the data to the front surface of the photograph, the information on the film surface read by READ can be imprinted after exposure of the photograph in such a manner as multiple exposure Further, even when the timing of the exposure and the printing is greatly different, there will be no problem by controlling the relationship between the printing paper and RAM memory.

Figure 18:
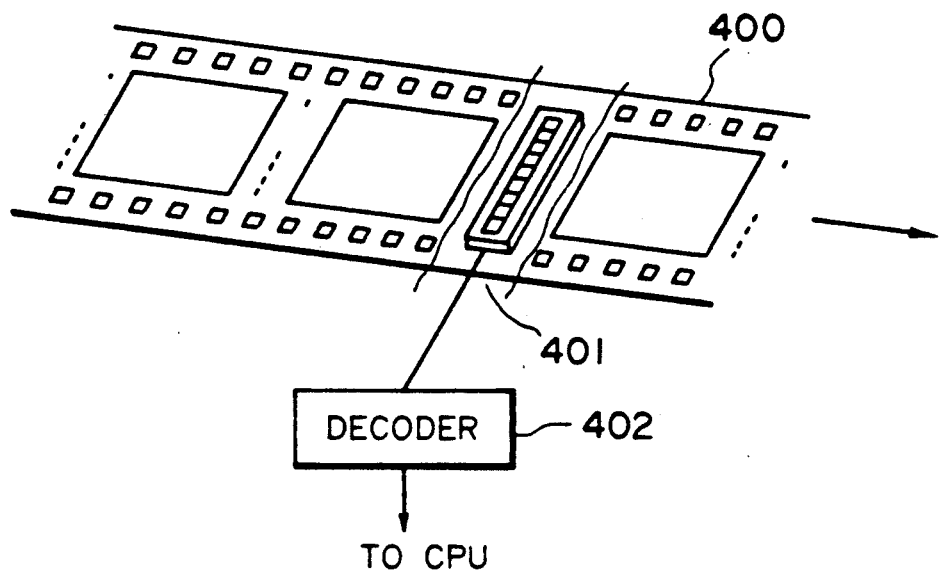
FIG. 18 specifically shows the READ portion in FIG. 16.

FIG. 18 shows "READ" in FIG. 16 more practically. In the figure, the developed film 400 with imprinted code is set on a film carrier (not shown). On the film carrier, there is mounted a sensor array which reads the imprinted code by each sensor. Decoder 402 receives the output signal of the sensor array 401 which outputs the multiple signal and cancel signal to CPU. CPU let RAM memorize the signals with the frame number of the film.

Figure 19:
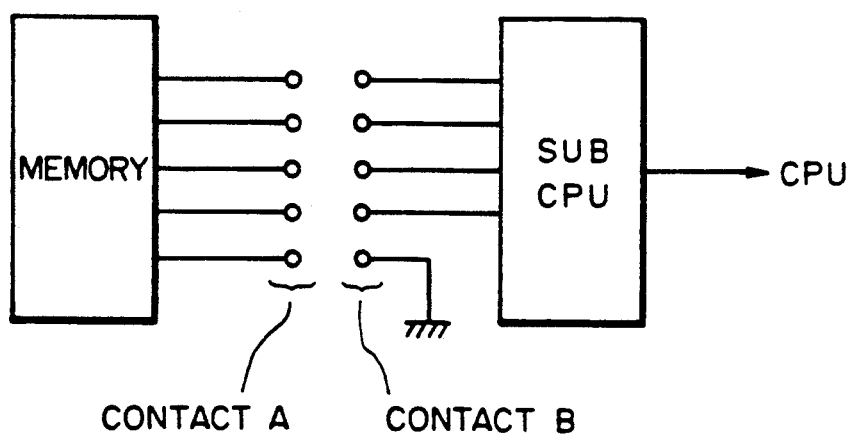
FIG. 19 shows an another embodiment of the READ portion in FIG. 16.

FIG. 19 shows an another embodiment of "READ" which is not an optical recording type but a type of film cartridge provided with a semiconductor memory. In this embodiment, the "READ" portion is constituted by a memory mounted on the film cartridge, contact A, contact B electrically connectable with contact B. and sub-CPU. "SUB CPU" reads out the frame number and the multiple information from the memory on the film cartridge in response to the reading command from CPU and sends them to CPU. It is the same as the previously described embodiment in which the printing apparatus scans the imprinted data on the film.

In the cases of the printers of the types described above, in order to cut the prints after printing, it suffices to store the length of the printing paper to be cut and then in response to the cutting-length data read out cut the printing Paper after the completion of the fixing process.

In the above two embodiments of the present invention, light emitting means such as light-emitting diodes, are flashed to record a desired information of each print, but it is to be understood that the present invention is not limited to them and that any other suitable means and methods may be used. For instance, a piece of light reflecting paper may be bonded or a magnetic medium may be used. Alternatively, the size data may be stored in an involatile storage device such as a magnetic recording medium, an EPROM, an EEPROM or the like in the form of a card which is detachably mounted on, for instance, a film cartridge.

Recording of the data into such means as described above is possible when suitable interfaces are attached to the output terminals of display microprocessor DMC.

It should be noted that, in the embodiments described above, description has been made for a camera using a film. However, it is apparent that the present invention is applicable for a camera using a magnetic recording medium, e.g. video camera and the like, or other types of camera using various kinds of image recording medium.

What is claimed is:

1. A camera system, comprising:
   (a) a camera having an indication means for indicating information that data should be recorded on a printed photograph, said indication means selectively indicating whether data recording should be performed on a front surface or a reverse surface of the printed photograph; and
   (b) a printing device comprising:
      (i) an input means for inputting indicating information of said indicating means; and
      (ii) a printing means for selectively printing the data onto the front surface or the reverse surface of the printed photograph in accordance with the indicating information of said input means.

2. A camera system according to claim 1, wherein said indication means comprises means for indicating that data printing should be performed on both the front surface and the reverse surface of the printed photograph.

3. A camera system according to claim 1, further comprising an operation means for remotely operating said indication means, said operation means being selectable so that the data recording by said indication means is performed on the front surface or the reverse surface of the printed photograph.

4. A camera system according to claim 1, wherein said indicating means comprises means for imprinting the indication information onto a photographic film surface.

5. A camera system according to claim 1, wherein said indication means comprises means for imprinting the indication information to an area out of a film frame within which the photograph to be recorded.

6. A camera system according to claim 1, wherein said indication means comprises means for recording the indication information on a photographic film.

7. A camera system according to claim 1, wherein said indication means comprises means for recording the indication information on an image recording means.

8. A camera system according to claim 1, wherein said indication information comprises aperture information pertaining to said camera.

9. A camera system according to claim 1, wherein said indication information comprises shutter information pertaining to said camera.

10. A camera system according to claim 1, wherein said indication means comprises means for selectively indicating whether data recording should be performed on the front surface or the reverse surface of the printed photograph in accordance with the content of said data.

11. A camera system according to claim 1, wherein the indication information comprises coded information.

12. A camera system according to claim 1, wherein said indication means comprises memory means for memorizing the indication information.

13. A camera system according to claim 12, wherein said memory means is a semiconductor memory device.

14. A camera system according to claim 13, wherein said memory means is provided or a photographic film cartridge.

15. A camera system according to claim 1, wherein said indication means comprises means for recording the indication information on an area out of film recording medium frame within which the photograph is to be recorded.

16. A camera comprising indication means for indicating that data should be recorded on a printed photograph, said indication means selectively indicating whether data recording should be performed on a front surface or a reverse surface of a printed photograph.

17. A camera system according to claim 16, wherein said indication means comprises means for indicating that data printing should be performed on both the front surface and the reverse surface of the printed photograph.

18. A camera system according to claim 16, further comprising an operation means for remotely operating said indication means, said operation means being selectable so that the data recording by said indication means is performed on the front surface or the reverse surface of the printed photograph.

19. A camera system according to claim 16, wherein said indicating means comprises means for imprinting the indication information onto a photographic film surface.

20. A camera system according to claim 16, wherein said indication means comprises means for imprinting the indication information on an area out of a film frame within which the photograph to be recorded.

21. A camera system according to claim 16, wherein said indication means comprises means for recording the indication information on a photographic film.

22. A camera system according to claim 16, wherein said indication means comprises means for recording the indication information on an image recording means.

23. A camera system according to claim 16, wherein said indication information comprises aperture information pertaining to said camera.

24. A camera system according to claim 16, wherein said indication information comprises shutter information pertaining to said camera.

25. A camera system according to claim 16, wherein said indication means comprises means for selectively indicating whether data recording should be performed on the front surface or the reverse surface of the printed photograph in accordance with the content of said data.

26. A camera system according to claim 16, wherein the indication information comprises coded information.

27. A camera system according to claim 16, wherein said indication means comprises memory means for memorizing the indication information.

28. A camera system according to claim 27, wherein said memory means is a semiconductor memory device.

29. A camera system according to claim 27, wherein said memory means is provided or a photographic film cartridge.

30. A camera system according to claim 16, wherein said indication means comprises means for recording the indication information on an area out of an image recording medium frame within which the photograph is to be recorded.

31. A printing apparatus, comprising:
    (a) an input means for inputting an indication information from a camera which selectively indicates whether data recording on said printed photograph should be performed on a front surface or a reverse surface of the printed photograph; and
    (b) a printing means for selectively printing the data on the front surface or the reverse surface of said printed photograph in accordance with the indication information of said input means.

32. A recording device for a camera comprising indication means for indicating that data should be recorded on a printed photograph, said indication means selectively indicating whether data recording should be performed on s front surface or a reverse surface of the printed photograph.

33. A data recording device according to claim 32, wherein said indication means comprises means for indicating that data printing should be performed on both the front surface and reverse surfaces of the printed photograph.

34. A data recording device according to claim 32, further comprising an operation means for remotely operating said indication means, said operation means being selectable so that the data recording by said indication means is performed on the front surface or the reverse surface of the printed photograph.

35. A data recording device according to claim 32, wherein said indicating means comprises means for imprinting the indication information onto a photographic film surface.

36. A data recording device according to claim 32, wherein said indication means comprises means for imprinting the indication information on an area out of a film frame within which the photograph to be recorded.

37. A data recording device according to claim 32, wherein said indication means comprises means for recording the indication information on a photographic film.

38. A data recording device according to claim 32, wherein said indication means comprises means for recording the indication information on an image recording means.

39. A data recording device according to claim 32, wherein said indication information comprises aperture information pertaining to said camera.

40. A data recording device according to claim 32, wherein said indication information comprises shutter information pertaining to said camera.

41. A data recording device according to claim 32, wherein said indication means comprises means for selectively indicating whether data recording should be performed on the front surface or on the reverse surface of the printed photograph in accordance with the content of said data.

42. A data recording device according to claim 32, wherein the indication information comprises coded information.

43. A data recording device according to claim 32, wherein said indication means comprises memory means for memorizing the indication information.

44. A data recording device according to claim 43, wherein said memory means is a semiconductor memory device.

45. A data recording device according to claim 43, wherein said memory means is provided or a photographic film cartridge.

46. A data recording device according to claim 31, wherein said indication means comprises means for respectively indicating said data and an indication number which shows whether the data recording should be performed on the front surface or on the reverse surface of the printed photograph as different information.

47. A data recording device for a camera comprising indication means for selectively indicating whether data recording on a printed photograph should be performed on a front surface or on a reverse surface of a printed photograph.

48. A data recording device according to claim 47, wherein said indication means comprises means for indicating that data printing should be performed on both the front surface and the reverse surface of the printed photograph.

49. A data recording device according to claim 47, further comprising an operation means for remotely operating said indication means, said indication means being selectable so that the data recording by said indication means is performed on the front surface or the reverse surface of the printed photograph.

50. A data recording device according to claim 47, wherein said indicating means comprises means for imprinting the indication information onto a photographic film surface.

51. A data recording device according to claim 47, wherein said indication means comprises means for imprinting the indication information on an area out of a film frame within which the photograph to be recorded.

52. A data recording device according to claim 47, wherein said indication means comprises means for recording the indication information on a photographic film.

53. A data recording device according to claim 47, wherein said indication means comprises means for recording the indication information on an image recording means.

54. A data recording device according to claim 47, wherein said indication information comprises aperture information pertaining to said data recording device.

55. A data recording device according to claim 47, wherein said indication information comprises shutter information pertaining to said data recording device.

56. A data recording device according to claim 47, wherein said indication means comprises means for selectively indicating whether data recording should be performed on the front surface or the reverse surface of the printed photograph in accordance with the content of said data.

57. A data recording device according to claim 47, wherein the indication information comprises coded information.

58. A data recording device according to claim 47, wherein said indication means comprises memory means for memorizing the indication information.

59. A data recording device according to claim 58, wherein said memory means is a semiconductor memory device.

60. A data recording device according to claim 58, wherein said memory means is provided on a photographic film cartridge.

61. A data recording device according to claim 47, wherein said indication means comprises means for recording the indication information on an area out of a film frame within which the photograph is to be recorded.

62. A data recording device according to claim 32, wherein said indication means comprises means for respectively indicating said data and an indication number which shows whether the data recording should be performed on the front surface or on the reverse surface of the printed photograph as different information.

63. A camera comprising indication means for selectively indicating whether data recording on a printed photograph should be performed on a front surface or on a reverse surface of a printed photograph.

64. A camera according to claim 63, wherein said indication means comprises means for indicating that data printing should be performed on both the front surface and the reverse surface of the printed photograph.

65. A camera according to claim 63, further comprising an operation means for remotely operating said indication means, said indication means being selectable so that the data recording by said indication means is performed on the front surface or the reverse surface of the printed photograph.

66. A camera according to claim 63, wherein said indicating means comprises means for imprinting the indication information onto a photographic film surface.

67. A camera according to claim 63, wherein said indication means comprises means for imprinting the indication information on an area out of a film frame within which the photograph to be recorded.

68. A camera according to claim 63, wherein said indication means comprises means for recording the indication information on a photographic film.

69. A camera according to claim 63, wherein said indication means comprises means for recording the indication information on an image recording means.

70. A camera according to claim 63, wherein said indication information comprises aperture information pertaining to said camera.

71. A camera according to claim 63, wherein said indication information comprises shutter information pertaining to said camera.

72. A camera according to claim 63, wherein said indication means comprises means for selectively indicating whether data recording should be performed on the front surface or the reverse surface of the printed photograph in accordance with the content of said data.

73. A camera according to claim 63, wherein the indication information comprises coded information.

74. A camera according to claim 63, wherein said indication means comprises memory means for memorizing the indication information.

75. A camera according to claim 74, wherein said memory means is a semiconductor memory device.

76. A camera according to claim 74, wherein said memory means is provided or a photographic film cartridge.

77. A camera according to claim 65, wherein said indication means comprises means for recording the indication information on an area out of a film frame within which the photograph is to be recorded.

78. A data recording device according to claim 32, wherein said indication means comprises means for respectively indicating said data and an indication number which shows whether the data recording should be performed on the front surface or on the reverse surface of the printed photograph as different information.

* * * * *

UNITED STATES PATENT AND TRADEMARK OFFICE
CERTIFICATE OF CORRECTION

PATENT NO. : 5,160,952
DATED : November 3, 1992
INVENTOR(S) : Tomonori IWASHITA, et al.

It is certified that error appears in the above-identified patent and that said Letters Patent is hereby corrected as shown below:

COLUMN 1:

line 1, "example" should read --example,--.

COLUMN 2:

line 41, "camera" should read --camera,--;
line 42, "an" should be deleted; and line 65, "FIG. 2," should read --Fig. 2, ■--.

COLUMN 5:

line 39, "However" should read --However,--.

COLUMN 6:

line 19, "a mark" should read --a ■ mark--.

COLUMN 7:

line 26, "shows" should read --shown--;
line 28, "DECI," should read --DEC1,--; and
line 33, "area" should read --area,--.

UNITED STATES PATENT AND TRADEMARK OFFICE
CERTIFICATE OF CORRECTION

PATENT NO. : 5,160,952

DATED : November 3, 1992

INVENTOR(S) : Tomonori IWASHITA, et al.

It is certified that error appears in the above-identified patent and that said Letters Patent is hereby corrected as shown below:

COLUMN 8:

line 41, "exposure" should read --exposure.--;
line 60, "contact β." should read --contact β,--;

COLUMN 9:

line 3, "Paper" should read --paper--;
line 61, "photograph" should read --photograph is--.

COLUMN 10:

line 20, "claim 13, should read --claim 12,--;
line 21, "or" should read --on--; and
line 52, "photograph" should read --photograph is--.

COLUMN 11:

line 12, "or" should read --on--;
line 22, "on said" should read --on a--;
line 24, "the" should read --said--;
line 33, "on s" should read --on a--; and
line 38, "surfaces" should read --surface--.

UNITED STATES PATENT AND TRADEMARK OFFICE
CERTIFICATE OF CORRECTION

PATENT NO. : 5,160,952
DATED : November 3, 1992
INVENTOR(S) : Tomonori IWASHITA, et al.

It is certified that error appears in the above-identified patent and that said Letters Patent is hereby corrected as shown below:

<u>COLUMN 12</u>:

line 17, "or" should read --on--;
   line 19, "claim 31," should read --claim 32,--;
   line 38, "indication" should read --operation--;
   line 49, "photograph" should read --photograph is--.

<u>COLUMN 14</u>:

line 6, "photograph" should read --photograph is--;
   line 32, "or" should read --on--; and
   line 34, "claim 65, should read --claim 63,--.

Signed and Sealed this

Thirtieth Day of November, 1993

Attest:

BRUCE LEHMAN

*Attesting Officer*    *Commissioner of Patents and Trademarks*